US011545807B2

(12) United States Patent
Turgeman et al.

(10) Patent No.: US 11,545,807 B2
(45) Date of Patent: Jan. 3, 2023

(54) COMPACT COAXIAL LASER (71) Applicant: IDEA MACHINE DEVELOPMENT DESIGN AND PRODUCTION LTD., Rehovot (IL)

(72) Inventors: Shlomo Turgeman, Rishon Letzion (IL); Mordechai Brestel, Rehovot (IL); Eitan Sheffer, Ramat Gan (IL); Michael Remes, Yad Binyamin (IL); Ben Zion Lavi, Rehovot (IL)

(73) Assignee: IDEA MACHINE DEVELOPMENT DESIGN AND PRODUCTION LTD., Rehovot (IL)

( * ) Notice: Subject to any disclaimer, the term of this patent is extended or adjusted under 35 U.S.C. 154(b) by 0 days.

(21) Appl. No.: 16/965,314

(22) PCT Filed: Jan. 29, 2019

(86) PCT No.: PCT/IB2019/050724
§ 371 (c)(1),
(2) Date: Jul. 28, 2020

(87) PCT Pub. No.: WO2019/145930
PCT Pub. Date: Aug. 1, 2019

(65) Prior Publication Data
US 2021/0119399 A1    Apr. 22, 2021

Related U.S. Application Data (60) Provisional application No. 62/627,822, filed on Feb. 8, 2018, provisional application No. 62/623,538, filed on Jan. 29, 2018.

(51) Int. Cl.
*H01S 3/03* (2006.01)
*H01S 3/08* (2006.01)
(Continued)

(52) U.S. Cl.
CPC .......... *H01S 3/0315* (2013.01); *H01S 3/0305* (2013.01); *H01S 3/038* (2013.01);
(Continued)

(58) Field of Classification Search
CPC .......... H01S 3/0975; H01S 3/03–0388; H01S 3/08081; H01S 3/08095; H01S 3/0818; H01S 3/0813–0817; H01S 3/22–227
See application file for complete search history.

(56) References Cited

U.S. PATENT DOCUMENTS 3,624,543 A * 11/1971 Rockwell, Jr. .......... H01S 3/032
                                                      372/63
4,087,763 A *  5/1978 George ............... H01S 3/09155
                                                      372/74
(Continued)

FOREIGN PATENT DOCUMENTS

CS    229752 B1 *  6/1984
DE   9003331 U1 *  8/1991
(Continued)

OTHER PUBLICATIONS

Yatsiv, "Conductively Cooled Capacitively Coupled RF Excited CO2 Lasers", pp. 252-257 in: Rosenwaks S. (eds) Gas Flow and Chemical Lasers. Springer Proceedings in Physics, vol. 15. Springer, Berlin, Heidelberg, 1987 https://doi.org/10.1007/978-3-642-71859-5_38.
(Continued)

Primary Examiner — Joshua King
(74) Attorney, Agent, or Firm — Daniel Feigelson (57) ABSTRACT A compact laser system with a folded annular resonator cavity defined by spherical mirrors (17, 18), enabling the generation of a multipass beam path between the mirrors, each beam pass inclined at a small angle to the axis between the mirrors to form a zig-zag path (28, 29) therebetween. A
(Continued)

long optical path is achieved within a short physical structure. The optical resonator cavity is confined in the gap between two cylindrical coaxial electrodes (13, 14) receiving RF power to excite the lasing gas. Apertures (23) are provided in the main cavity mirrors (17, 18), with a high reflectivity end mirror (24) behind one aperture at one end and a partially reflective output coupler (25) at the other end. A channeled ceramic cylindrical element (15, 20) within the annular shaped gap between the two cylindrical electrodes confines the lasing gas to the channels (16).

21 Claims, 8 Drawing Sheets (51) Int. Cl.
  *H01S 3/0975* (2006.01)
  *H01S 3/223* (2006.01)
  *H01S 3/038* (2006.01)
  *H01S 3/07* (2006.01)
(52) U.S. Cl.
  CPC .......... *H01S 3/076* (2013.01); *H01S 3/08068* (2013.01); *H01S 3/08095* (2013.01); *H01S 3/0975* (2013.01); *H01S 3/2232* (2013.01)

(56) References Cited

U.S. PATENT DOCUMENTS

| | | | |
|---|---|---|---|
| 4,439,860 A * | 3/1984 | Kurnit | H01S 3/063 372/64 |
| 4,554,667 A | 11/1985 | Kaminski | |
| 4,689,798 A * | 8/1987 | Fox | H01S 3/034 372/4 |
| 4,756,000 A | 7/1988 | Macken | |
| 4,787,090 A | 11/1988 | Newman et al. | |
| 4,805,182 A * | 2/1989 | Laakmann | H01S 3/0315 372/87 |
| 4,813,052 A * | 3/1989 | DeMaria | H01S 3/0315 372/64 |
| 4,847,852 A | 7/1989 | Yatsiv et al. | |
| 4,872,179 A * | 10/1989 | Nitsche | H01S 3/081 372/19 |
| 4,939,506 A | 7/1990 | Gram | |
| 4,961,201 A * | 10/1990 | Opower | H01S 3/0315 372/64 |
| 5,008,894 A | 4/1991 | Laakmann | |
| 5,022,032 A * | 6/1991 | Chien | H01S 3/0975 372/18 |
| 5,029,173 A * | 7/1991 | Seguin | H01S 3/08081 372/87 |
| 5,065,405 A | 11/1991 | Laakmann et al. | |
| 5,099,492 A * | 3/1992 | Zajdman | H01S 3/0818 372/66 |
| 5,131,003 A * | 7/1992 | Mefferd | H01S 3/038 372/64 |
| 5,210,768 A * | 5/1993 | Seguin | H01S 3/081 372/18 |
| 5,215,864 A | 7/1993 | Laakmann | |
| 5,327,446 A * | 7/1994 | Waynant | H01S 3/0975 372/64 |
| 5,353,299 A * | 10/1994 | Martinen | H01S 3/0818 372/99 |
| 5,373,525 A * | 12/1994 | Nowack | H01S 3/0315 372/99 |
| 5,479,429 A * | 12/1995 | Habich | H01S 3/08 372/66 |
| 5,602,865 A | 2/1997 | Laakmann et al. | |
| 5,640,411 A * | 6/1997 | Bochum | H01S 3/0315 372/19 |
| 5,648,980 A * | 7/1997 | Seguin | H01S 3/073 372/98 |
| 5,689,523 A * | 11/1997 | Seguin | H01S 3/073 372/18 |
| 5,771,259 A | 7/1998 | Dvorkin | |
| 5,854,806 A * | 12/1998 | Sutter | H01S 3/0975 372/98 |
| 5,953,360 A | 9/1999 | Vitruk et al. | |
| 6,134,256 A * | 10/2000 | Chenausky | H01S 3/0975 372/55 |
| 6,192,061 B1 | 2/2001 | Hart et al. | |
| 6,195,379 B1 | 2/2001 | Jones et al. | |
| 6,198,758 B1 | 3/2001 | Broderick et al. | |
| 6,198,759 B1 | 3/2001 | Broderick et al. | |
| 6,285,703 B1 * | 9/2001 | Schluter | H01S 3/0975 372/99 |
| 6,442,187 B1 * | 8/2002 | Dutov | H01S 3/0315 372/101 |
| 6,473,445 B1 * | 10/2002 | Zeller | H01S 3/038 372/87 |
| 6,577,666 B2 * | 6/2003 | Erhard | H01S 3/09415 372/99 |
| 6,603,793 B2 * | 8/2003 | Vetrovec | H01S 3/0604 372/95 |
| 6,788,722 B1 | 9/2004 | Kennedy et al. | |
| 6,798,816 B2 | 9/2004 | Dearia et al. | |
| 6,975,662 B2 * | 12/2005 | Fujioka | H01S 3/03 372/99 |
| 7,046,709 B2 | 5/2006 | Seguin et al. | |
| 7,260,134 B2 | 8/2007 | Shackelton et al. | |
| 7,756,182 B2 | 7/2010 | Newman et al. | |
| 7,778,303 B2 * | 8/2010 | Villarreal-Saucedo | H01S 3/0975 372/55 |
| 2002/0071466 A1 * | 6/2002 | Zeller | H01S 3/041 372/87 |
| 2004/0146081 A1 * | 7/2004 | Deile | H01S 3/0385 372/55 |
| 2005/0163184 A1 * | 7/2005 | Hilliard | H01S 3/08004 372/66 |
| 2006/0227841 A1 * | 10/2006 | Savich | H01S 3/0608 372/69 |
| 2007/0133643 A1 * | 6/2007 | Seguin | H01S 3/073 372/55 |
| 2007/0189353 A1 * | 8/2007 | Monty | H01S 3/0385 372/87 |
| 2007/0195839 A1 * | 8/2007 | Monty | H01S 3/0971 372/38.05 |
| 2009/0180510 A1 * | 7/2009 | Borstel | H01S 3/005 372/90 |
| 2012/0219028 A1 * | 8/2012 | Morrow | H01S 3/0315 372/55 |
| 2013/0272325 A1 | 10/2013 | Rosenthal et al. | |

FOREIGN PATENT DOCUMENTS

| | | | |
|---|---|---|---|
| DE | 4026516 A1 * | 2/1992 | |
| DE | 4325063 A1 * | 2/1995 | ........... H01S 3/0315 |
| DE | 19516791 A1 * | 11/1996 | ........... H01S 3/038 |
| DE | 29824072 U1 * | 7/2000 | ........... H01S 3/0315 |
| EP | 0278201 A1 * | 8/1988 | |
| EP | 0610170 A1 * | 8/1994 | |
| FR | 2108912 A2 * | 5/1972 | |
| KR | 20010105222 A * | 11/2001 | |
| WO | WO-0077894 A1 * | 12/2000 | ........... H01S 3/0315 |

OTHER PUBLICATIONS

Lorini et al., "Accurate Gas Diagnostics for Sealed-Off CO Lasers Using Near-Infrared DFB Semiconductor Lasers", IEEE Journal of Quantum Electronics, vol. 34, No. 6, Jun. 1998, pp. 949-954.

Lapucci et al., "Beam properties of an R.F—discharge annular CO2 laser", Optics Communications vol. 111 (1994) pp. 290-296, Oct. 1, 1994.

Lapucci et al., "Beam quality enhancement for a radio-frequency excited annular CO2", Applied Physics Letters vol. 73, No. 18 Nov. 2, 1998, pp. 2549-2551.

(56) References Cited

OTHER PUBLICATIONS

Lapucci et al., "Discharge impedance variations in large area radio frequency excited CO2", Appl. Phys. Lett. 71 (14), Oct. 6, 1997, pp. 1933-1935.

Lapucci et al., "Extraction of high-quality beams from narrow annular laser sources", Applied Optics, vol. 38, No. 21, pp. 4552-4557, Jul. 20, 1999.

Ciofini et al., "Guided Talbot resonators for annular laser sources", J. Opt. A: Pure Appl. Opt. 2 (2000) 223-227.

Lapucci et al., "On the Longitudinal Voltage Distribution in Radio-Frequency-Discharged CO2 Lasers with Large-Area Electrodes", IEEE Journal of Quantum Electronics, vol. 31, No. 8, Aug. 1995, pp. 1537-1542.

Lapucci et al., "Polarization state modifications in the propagation of high azimuthal order annular beams", Optics Express, vol. 9, No. 12, Dec. 2001, pp. 603-609.

Lapucci et al., "Working properties of compact rf-excited CO2 slab lasers" Proceedings of XI International Symposium on Gas Flow and Chemical Lasers and High Power Laser Conference, SPIE 1996, vol. 3092, pp. 196-199.

Lapucci et al., "Pulse behaviour of a compact RF discharged CO2 slab laser", Optics and Laser Technology, vol. 28 No. 3, pp. 187-191, 1996.

Lapucci et al., "Triple slab radio-frequency discharged CO2 laser", Appl. Phys. Lett. 62 (I), Jan. 4, 1993, pp. 7-9.

Cherezov et al., "The stability of the active mediumof RF-exited CO2 lasers with gold as catalyst", Appl. Phys. B 71, pp. 503-507 (2000).

Tskhai et al., "The catalytic activity of gold-plated electrodes in a slab-geometryCO2 laser", Appl. Phys. B 65, pp. 45-48 (1997).

Starostin et al., "Catalyst enhanced high power radio frequency excited CO2 slab laser", Applied Physics Letters vol. 77, No. 21 Nov. 20, 2000, pp. 3337-3339.

Vitruk et al., "The characteristics and stability of high power transverse radio frequency discharges for waveguide CO, slab laser excitation", J. Phys. D: Appl. Phys. 25 (1992) pp. 1767-1776.

Baker, "Direct measurement of the electrical impedance of narrow gap radio frequency gas discharges in the 100 MHz region", Meas. Sci. Technol. 7 (1996) pp. 1631-1635.

Rauf et al., "Longitudinal Power Distribution and Corresponding Temperature Distribution in a RF Waveguide CO2 Laser", Piers Online, vol. 2, No. 6, 2006, pp. 619-623.

Vitruk et al., "Similarity and Scaling in Diffusion-Cooled RF-Excited Carbon Dioxide Lasers", IEEE Journal of Quantum Electronics, vol. 30, No. I, Jul. 1994, pp. 1623-1634.

Plinski et al., "The laser pulse from a rf waveguide CO2 laser", Appl. Phys. B 76, pp. 375-382 (2003).

Hill et al., "Carbon dioxide waveguide lasers with folds and tilted mirrors", Applied Optics, vol. 29, No. 15, May 20, 1990, pp. 2240-2245.

Banerji et al., "Effects of curved mirror misalignment in a folded waveguide", Applied Optics, vol. 29, No. 6, Feb. 20, 1990, pp. 777-785.

Hill et al., "Waveguide Laser Resonators with a Tilted Mirror", IEEE Journal of Quantum Electrokics. vol. QE-22. No 7, Jul. 1986, pp. 1078-1087.

Xin et al., "Multipass coaxial radiofrequency discharge CO2 laser", Optics Communications, vol. 58, No. 6, pp. 420-422, Jul. 15, 1986.

Herriott et al., "Off-Axis Paths in Spherical Mirror Interferometers", Applied Optics, vol. 3, No. 4, Apr. 1964, pp. 523-526.

Xin et al., "Compact, multipass, singie transverse mode CO2 laser", Appl. Phys, Lett., vol. 51, No. 7, Aug. 17, 1987, pp. 469-471.

Granson et al., "Power scaling issues of diffusion cooled annular CO2 lasers in the multi-kilowatt region", Proceedings of SPIE, 6872, Jan. 21, 2008, p. 687209.

Yelden et al., "Phase locking in a nwltichanne! radial array CO2 laser", Appl. Phys. Lett. vol. 62 No. 12, Mar. 22, 1993, pp. 1311-1313.

* cited by examiner

COMPACT COAXIAL LASER

CROSS-REFERENCE TO RELATED APPLICATIONS

This application claims Paris Convention priority from, and the US benefit of, U.S. provisional application Ser. No. 62/623,538, filed Jan. 29, 2018, and U.S. provisional application Ser. No. 62/627,822, filed Feb. 8, 2018. The contents of these provisional applications are incorporated herein by reference.

FIELD

This application relates to the field of gas laser cavities, especially those excited by RF between coaxially arranged electrodes, to provide a compact configuration.

BACKGROUND

Since DC longitudinally excited lasers have an output of the order of 80 Watts/m. length of the laser cavity, other technologies have been developed, such as fast flow technologies on the one hand, and diffusion cooling between flat slabs on the other hand, both of these techniques providing much higher output powers per length than the original simple DC longitudinally excited lasers. In addition, for slab lasers using diffusion cooling, the confinement of the gaseous lasing medium to channels within a ceramic insert within the laser gap, also increases the achievable laser substantially. Such RF excited slab lasers with the beam path defined by channels in a ceramic slab element, are well known, such as in U.S. Pat. No. 7,046,709 for $CO_2$ Laser with Beryllium Oxide Waveguides" to V. Seguin et al, or U.S. Pat. No. 6,192,061 for "RF Excited Waveguide Laser" to R. A. Hart et al, or U.S. Pat. No. 6,798,816 for "Folded Tapered-Waveguide CO Laser, to A. J DeMaria et al. However, the prior art slab-shape of these slab lasers makes it difficult to reduce the size of the laser, which has to be sufficiently wide to accommodate the full width of the slab.

There therefore exists a need for a more compact, high power laser cavity, which overcomes at least some of the disadvantages of prior art systems and methods.

The disclosures of each of the publications mentioned in this section and in other sections of the specification, are hereby incorporated by reference, each in its entirety.

SUMMARY

The present disclosure describes new exemplary laser systems, providing, for a given output power, particularly more compact configurations, while maintaining high beam quality. The systems comprise a folded optical resonator cavity defined by spherical mirrors having a radius of curvature and mounted at a distance apart which enables the generation of a multipass beam path between the mirrors, with each beam pass inclined at a small angle to the axis between the mirrors. The folding angle between the incident and reflected beams at either of the mirrors, and the distance between the mirrors is calculated such that the path returns to its original starting point after an integral number of zig-zag trips, with the point of reflection at the end of each traverse of the mechanical length of the cavity processing around circles on the surfaces of the respective mirrors. The advantage of such a cavity geometry is that a long optical path is achieved within a short physical structure. This enables a good mode and a high power output to be achieved in a short mechanical structure. The optical resonator cavity is confined in a gap between two cylindrical coaxial electrodes receiving RF power to excite a gas mixture, generating a plasma discharge under conditions that produce a population inversion in the gaseous lasing medium. In order to extract a laser beam from the excited multipass resonator cavity, a small aperture is provided in each of the main cavity mirrors, at each end of the cavity, with an end mirror situated beyond each of these apertures, one end mirror being highly reflective, and the other being partially reflective and acting as the output coupler.

The presently-disclosed cavity differs from annular cavities such as that described in U.S. Pat. No. 4,847,852 for "Ultra Compact RF Excited Gaseous Lasers", having a common inventor with the present application, in that within the annular shaped cross sectional gap between the two cylindrical electrodes, a channeled ceramic cylindrical element is used in order to confine the plasma discharge to within the channels only. The channels in the ceramic element have a precalculated shape and dimension, and when mounted inside the gap between the electrodes, duplicate the zig-zag optical beam path defined by the mirror radius of curvature and distance apart. Since the volume of the excited plasma is defined by the ceramic lined channels, which have a significantly reduced volume compared with prior art coaxial lasers, the RF exciting power level required to provide a specific power output is reduced, thereby improving beam quality compared with that of the above referenced U.S. Pat. No. 4,847,852 annular laser, and increasing the laser efficiency compared to other prior art multipass coaxial lasers not using channeled ceramic sleeves.

The coaxial electrode pair with their channeled ceramic insert, are advantageously constructed of segments. In some implementations, each segment comprises three layers—an inner electrode layer, an intermediate channeled ceramic layer and an outer electrode layer. When the segments are connected circumferentially, they form a complete cylindrical assembly having an annular ceramic element with the lasing channel generating between mirrors, in the form of a zig-zag lasing path through the channels within the ceramic elements. The connected segments may be forced against the inner surface of the bore of the laser housing by use of a central spring assembly directing its force radially outwards. Alternatively, a mechanical mechanism may be used to provide a positive driven mechanical force radially outwards to apply force to the connected segments. The use of such a radially outward-forced segmented construction provides good mechanical stability of the lasing cavity within the laser housing, good thermal contact with the cooling channels in the laser housing, and good electrical contact for the RF feed to the outer electrodes. The thermal contact can also be achieved by providing a flat outer surface of the cylindrical electrode/ceramic unit, such that the assembled units acquire an external polygon shape, rather than an external circular cylindrical shape, with which it is more difficult to make efficient thermal contact. Gas sealing is achieved with a reservoir gas volume, and a liquid coolant flow in the laser housing is used to achieve the desired lasing gas temperature when excited with RF power. The housing is vacuum closed and sealed with flanges, including an RF power feedthrough connection, which can include an RF matching mechanism. The electrode assembly is designed to withstand extreme temperature operational and storage conditions.

The construction of a laser according to the present disclosure, is so compact and is mechanically so robust that the mirrors may be mounted permanently to the laser housing without the need to provide any subsequent alignment adjustment. During manufacture, the assembled laser housing is held in a jig, the mirrors are mounted in the jig and their optical alignment checked using an optical table, and are then cemented onto the laser housing using an adhesive.

Using the above described construction, it is expected to be possible to achieve in a CW carbon dioxide laser, an output power of 60 Watts in a laser having dimensions of only 90×90×120 mm.

There is thus provided in accordance with an exemplary implementation of the devices described in this disclosure, a laser system, comprising:

(i) a housing having a first end and a second end, and a bore having an axis running between the first and second ends, (ii) a pair of coaxial metallic electrodes disposed within the bore, the pair comprising an inner electrode and an outer electrode, the electrodes being constructed to have a gap between them and configured to have an RF field applied between them, (iii) folding mirrors disposed at each end region of the housing, and (iv) a ceramic material disposed in the gap between the coaxial electrodes, the ceramic material having a series of channels formed therein, such that they generate a zig-zag pathway between the folding mirrors, wherein the zig-zag pathway, when filled with a gain medium, and the folding mirrors, together constitute a laser resonator cavity.

In such a laser system, the pair of coaxial metallic electrodes and the ceramic material may be made up of a plurality of circumferentially angular segments, each segment comprising a longitudinal section of the ceramic material sandwiched between sections of the inner and outer electrodes, the segments being disposed circumferentially to each other to form a cylinder. In such a case, the segments may either have a curved outer surface having a circular curvature, whose radius matches the radius of the corresponding circularly curved internal surface of the bore, or alternatively, the segments may be provided with a flat outer surface, configured to ensure good thermal contact with corresponding flat surfaces formed within the bore.

In any of the above described implementations of the laser system, the folding mirrors may advantageously be spherical mirrors. Additionally or alternatively, they may be annular in shape.

According to further exemplary implementations of the above-described laser system, each of the folding mirrors may comprise an aperture disposed in its peripheral region, opposite an end of a channel formed in the ceramic material, the laser system further comprising an end mirror disposed adjacent to each aperture, one of the end mirrors being a full reflector, and the other of the end mirrors being a partial reflector. In this case, the end mirrors should be aligned with their reflecting surfaces perpendicular to a channel of the zig-zag path generated in the ceramic material.

As an alternative to the previously described implementation of the preceding paragraph, one of the folding mirrors may comprise an aperture disposed in its peripheral region, opposite an end of a channel formed in the ceramic material, the laser system further comprising a pair of end mirrors disposed adjacent the aperture, one of the end mirrors being a full reflector, and the other of the end mirrors being a partial reflector. In this case, each of the end mirrors is preferably oriented with its reflecting surface perpendicular to one of the two channels meeting opposite the aperture.

Any of the above described laser systems in which the coaxial metallic electrodes and the ceramic material are made up of angular segments may further comprise a set of radially acting spring elements disposed within the inner electrode, such that the segments are forced by the spring elements against the inner surface of the bore of the housing. These spring elements may be leaf springs aligned along the length of the inner electrode segments.

An alternative implementation of the above described laser systems comprises a mechanical mechanism disposed within the inner electrodes, for generating a radially outwardly directed force, such that the segments are forced against the inner surface of the bore of the housing. Such a laser system may further comprise a thin intermediate layer of a soft metallic material disposed between at least one of the outer electrode and the ceramic material, and the ceramic material and the outer electrode. Advantageously, the thin intermediate layer of a soft metallic material, may be a silver foil, optionally with a gold coating.

The mechanical mechanism may comprise an elongated base element having a slot with sloping ends, and a pressure element having matching sloping ends disposed within the slot, such that a longitudinal force applied to at least one of the sloping ends causes the pressure element to move out of the slot. Such a mechanism can further comprise a screw disposed such that its rotation supplies the longitudinal force.

Furthermore, in any of the above mentioned laser systems, the ceramic material may be beryllium oxide or aluminium oxide.

Additionally, the gain medium may be such that the laser system is a carbon dioxide laser system or it may be such that the laser system is a carbon monoxide laser system.

BRIEF DESCRIPTION OF THE DRAWINGS

The present invention will be understood and appreciated more fully from the following detailed description, taken in conjunction with the drawings in which:

FIG. 2A is a schematic isometric drawing showing the arrangement of the zig-zag path of the channels in the ceramic layer between the inner and outer electrodes, while

DETAILED DESCRIPTION

Figure 1:
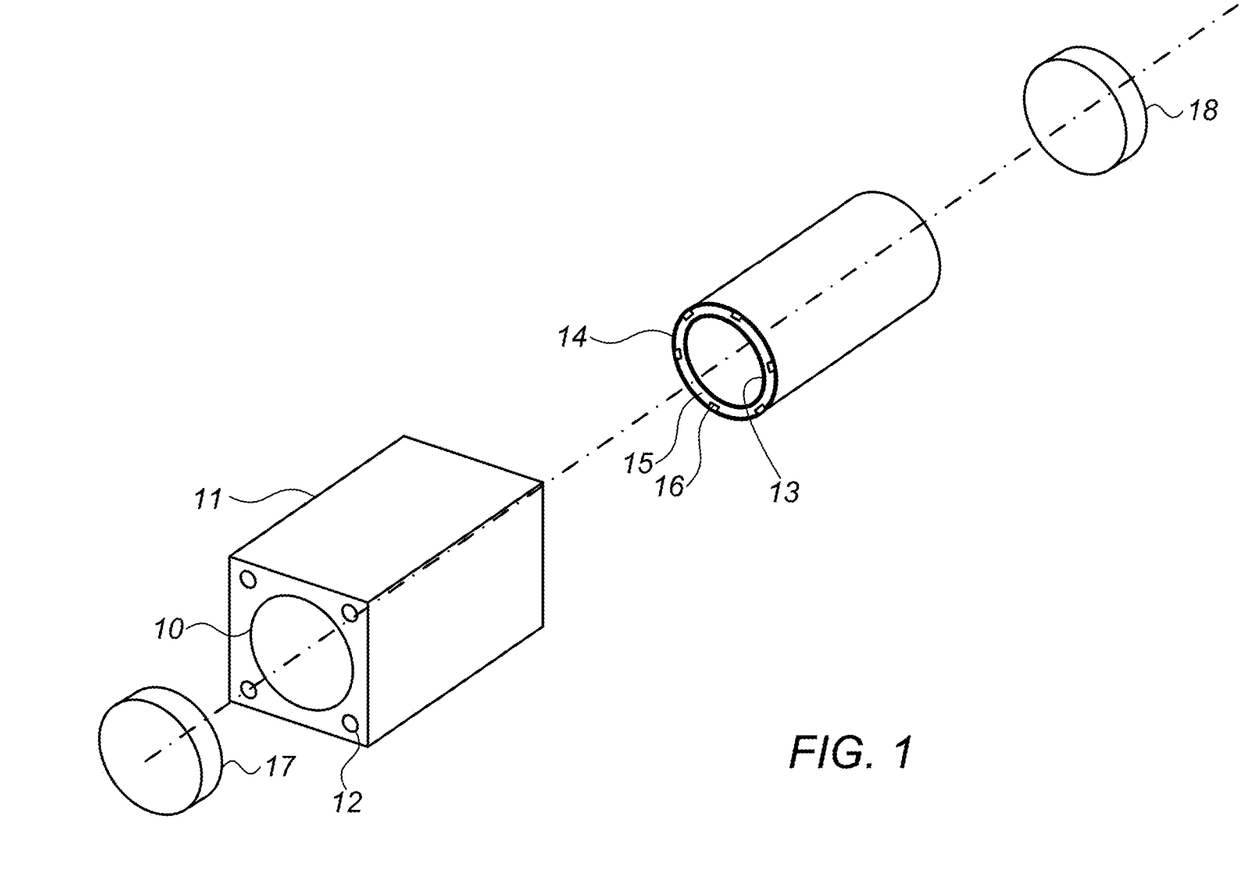
FIG. 1 illustrates an exploded schematic isometric view of the components of one exemplary implementation of the compact coaxial laser cavity of the present disclosure.

Reference is now made to FIG. 1, which illustrates an exploded schematic isometric view of the components of one exemplary implementation of the compact coaxial laser cavity of the present disclosure. The laser cavity is contained within the inner cylindrical bore 10 formed in an outer housing 11, preferably made of a conductive metal such as aluminium, which incorporates cooling channels 12 for removing the heat generated by the laser discharge.

The electrode structure is contained within the inner cylindrical bore 10, and comprises a coaxial cylindrical structure, having an inner electrode 13 and a concentric or coaxial outer electrode 14, with a sleeve of ceramic material 15 essentially filling the gap formed between the inner 13 and outer 14 electrodes. The ceramic sleeve shaped material has zig-zag shaped channels formed within it, with the ends of the zig-zag sections meeting at the ends of the electrode structure, such that a continuous zig-zag path is generated between the ends of the cylindrical electrode structure. One set of ends 16 of the channels are visible in FIG. 1, and the form of the channels along the length of the ceramic material will be more clearly shown in FIG. 2A hereinbelow. The electrode structure is shown in FIG. 1 as a circular cylinder, which fits inside the inner circular surface of the bore 10. The laser cavity is completed by a pair of mirrors, 17, 18, which should advantageously be spherical mirrors, to form a stable resonator. Although the mirrors 17, 18 are show for simplicity in FIG. 1 as fully circular mirrors, in practice, it is more advantageous to use annularly shaped spherical mirrors, so that if necessary after mounting of the mirrors, the central elements of the cavity, as will be shown in FIGS. 3 and 4 below, can be inserted into place inside the inner electrode 13, or removed for servicing, and so that the RF exciting voltage can be delivered axially to the electrodes. The lasing medium, in the form of a fluid, is contained within the channels 16, and is selected to provide efficient lasing output in the configuration described. A common such lasing medium can be the gaseous mixture for use in a $CO_2$ laser, generally comprised of carbon dioxide and nitrogen, with the bulk being helium. The RF power needed to excite the gain medium to its lasing levels is applied between the inner 13 and outer 14 electrodes, with the outer electrode generally being at earth potential, because of its contact with the metallic housing 11. Depending on the radius of curvature of the mirrors, and the lateral dimensions of the channels, the lasing mode can be either a free space mode, or it can be completely waveguided, or a cross between the two.

Figure 2A:
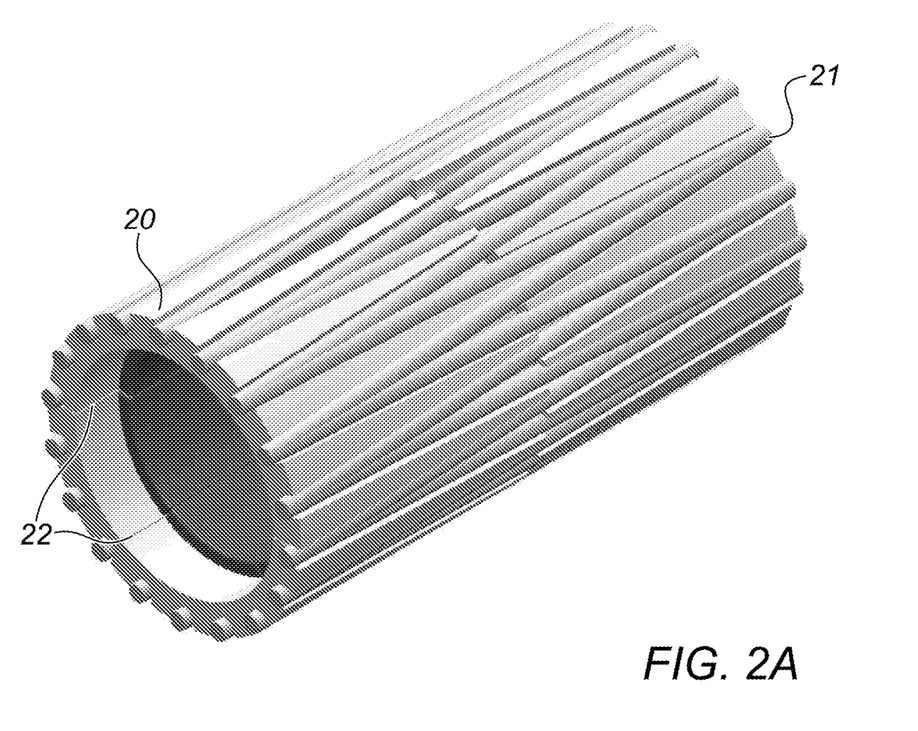

Reference is now made to FIG. 2A, which is a schematic isometric drawing showing the arrangement of the zig-zag path of the channels in the ceramic layer between the inner and outer electrodes, the zig-zag path defining the true optical axis of the laser resonator. The lasing gain medium is contained within the channels, and may be a single charge, for a sealed off laser, or may be slowly or periodically refreshed for a laser requiring replenishment of the lasing medium gas. In the example shown in FIG. 2A, the angle between the zig-zag channel paths and the axial direction of the ceramic cylinder is calculated such that after thirty six traverses of the length of the cylindrical ceramic layer, meaning eighteen impingements around the circumference on the mirrors at each end of the ceramic element, the path is closed upon itself again, such that a laser beam 21 generated within the channels can continue its passage through the cavity, gaining power from the RF excitation at each traverse.

The ceramic layer 20 shown in FIG. 2A, which is an example of a practical implementation of a ceramic layer as shown schematically in FIG. 1, is shown in FIG. 2A with the channels formed on its outer surface, and if contact of the plasma with the metal of the outer electrode is to be avoided, a layer of ceramic may be applied to the inner face of the outer electrode. However, the channels could equally well be formed on the inner surface of the ceramic, in which case the outer layer of the metal of the inner electrode should be covered with a ceramic layer, or thirdly, the channels could be formed within a sintered ceramic cylindrical form.

There are two problems involved in the use of a single cylindrical ceramic element having channels formed in its surface, as described hereinabove. Firstly, there are practical difficulties, in the costly and complex manufacture of such a single cylindrical ceramic element having channels formed in its surface, or within its bulk between its surfaces. Secondly, and more importantly, such a single annular piece of ceramic material may be subject to breakage under thermal stress, especially over the wide temperature range expected in a comparatively high power density laser cavity, such as a $CO_2$ laser. Referring back to FIG. 1, since the expansion coefficient of ceramics is substantially less than that of the metal housing 10 surrounding it, which is typically constructed of aluminium, there is difficulty in maintaining good thermal contact between the cylindrical ceramic element 15 and the outer electrode 14 surrounding it, which itself is cooled by the aluminium housing 10. An alternative manufacturing procedure is proposed in the present disclosure for constructing the channelized ceramic element. Reference is now made back to FIG. 2A, which further illustrates the method of forming the cylindrical ceramic element from circumferentially angular segments of channeled ceramic elements, this method being both cost-effective and solving the problem of potential failure due to incomplete thermal cooling. As is observed in FIG. 2A, the channeled ceramic element 20 is not constructed of a single annular ceramic piece, but is made up of separate circumferential segments, which our joined together at their longitudinal boundaries, as shown by the fine cracks 22, to produce a complete ceramic annulus.

Figure 2B:
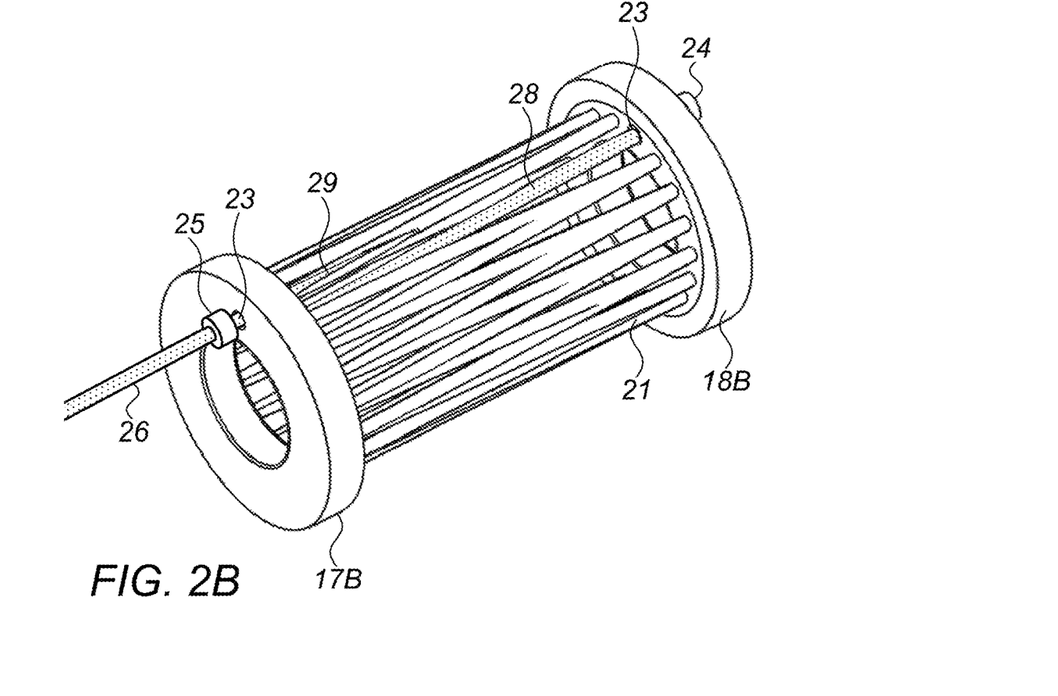
FIGS. 2B and 2C illustrate schematically two alternative methods of extracting laser power from the cavity of FIG. 1 and FIG. 2A.

The compact laser resonator cavity shown in FIGS. 1 and 2A, supports a lasing beam within the cavity between the fully reflective mirrors 17, 18, but does not show any way of extracting a laser beam from the cavity. Reference is now made to FIG. 2B, which illustrates a first method of extracting a laser beam from the excited multipass resonator cavity shown in FIGS. 1 and 2A. In FIG. 2A, the mirrors of the optical cavity of FIG. 1, which act only as folding mirrors, are shown as annular mirrors 17B and 18B, as mentioned above. A small off-axis aperture 23 is provided in each of the main cavity folding mirrors 17B, 18B, with end mirrors 24 and 25 situated respectively outside each of these apertures relative to the resonator cavity, one end mirror 24 being a full reflector, and the other end mirror 25 being partially reflective and acting as the output coupler for the laser beam 26. In order to utilize as much of the zig-zag lasing path length as possible, it is important that the full rear reflector mirror 24 and the output coupler mirror 25 have as long as possible an optical path length between them through the gain medium in the channels. In the implementation shown in FIG. 2B, this is achieved by locating the apertures 23 at azimuthally immediately adjacent folding mirror impingement points, but at opposite ends of the cavity. The propagation down the directly adjacent path of the leg of the zig-zag path between the apertures 23 is prevented, such that the lasing beam cannot pass directly between them, but, for the exemplary implementation shown in FIG. 2B, has to traverse all 35 remaining clear gain channels of the 18 zig-zag pairs of channels. By this means, the lasing beam has to traverse the full effective length of the cavity between rear reflector and output coupler, ensuring maximum effective cavity length. The prevention of the beam "short-circuiting"

the single cavity-length propagation path between the apertures 23, is achieved by alignment of the end mirrors 24, 25, around an axis along a radius to the annular folding mirror, to an angle equal to the angle which each leg of the zig-zag path makes with a line parallel to the longitudinal axis of the cavity. As a result, the end mirrors 24, 25, reflect the beam incident on them, back in the direction of incidence of the beam, rather than generating the zig-zag path which a normally aligned mirror, such as the folding mirrors 17B, 18B, would generate. This is shown schematically in FIG. 2B by shading on the end legs 28, 29, of the zig-zag propagation path. Unlike the beams in the other legs of the zig-zag paths, which are shown bifurcated, representing the incident and reflected legs of each beam, the beam 28 incident on the rear reflector 24 is shown as returning along its incident path, and the beam 29 incident on the output coupler 25, is also shown returning along its incident path, and they do traverse a common path between themselves.

Figure 2C:
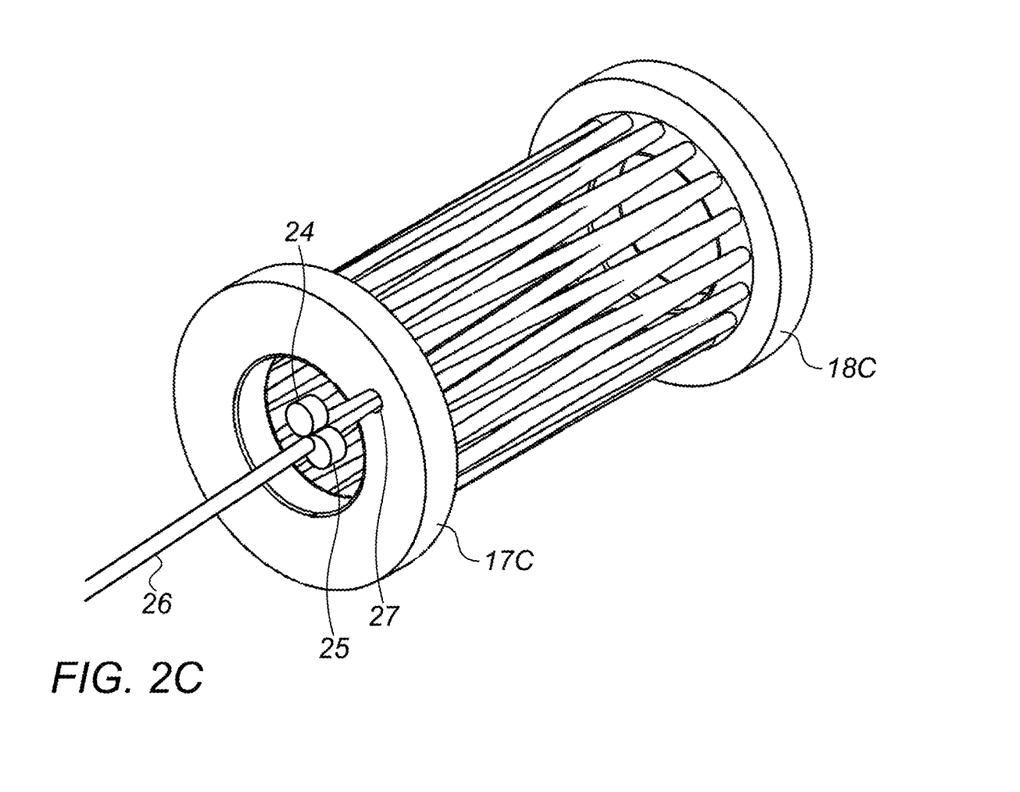

Reference is now made to FIG. 2C, which illustrates an alternative method of providing the end mirrors 24, 25, at the same end of the optical cavity using only a single aperture 27 in the folding mirror 17C at the output end of the cavity, with the other folding mirror 18C, being complete. The pair of small end mirrors are positioned side by side outside of the aperture 25 location, one of the end mirrors 24 being the full end reflector, and the other 25 the output coupler. The small end mirrors must be aligned with the appropriate angle between them, such that each reflects the beam incident on it normally back down its leg of the zig-zag path. This arrangement has the advantage that all of the legs (36 legs in the example used to illustrate the laser cavity) are used for providing laser gain, thereby increasing the laser beam quality and efficiency somewhat.

Figure 3:
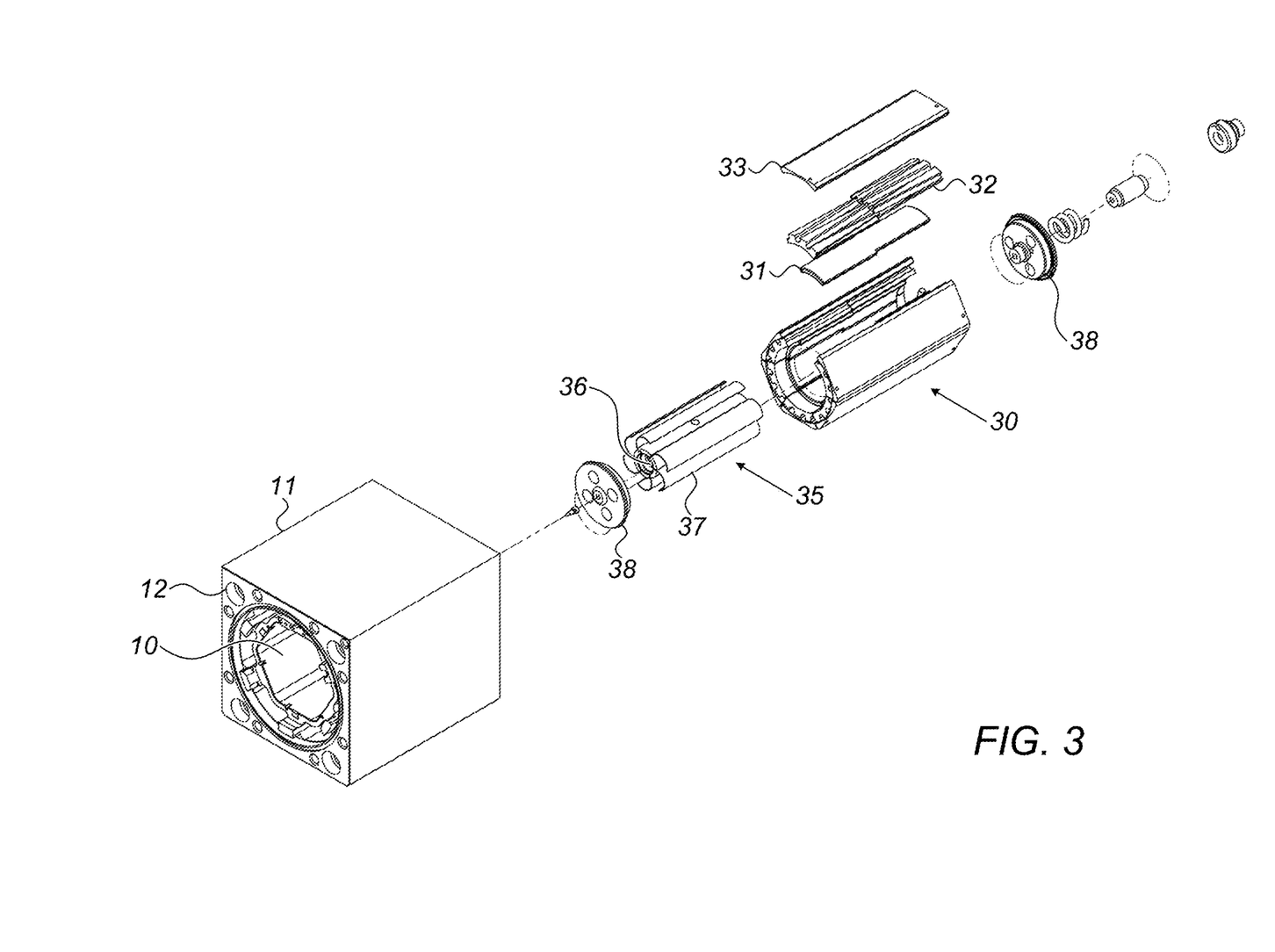
FIG. 3 is an exploded isometric engineering drawing showing the structure of an exemplary laser cavity housing and its components, using a segmented electrode structure.

Reference is now made to FIG. 3, which is an exploded isometric engineering drawing showing the structure of an exemplary laser housing and its cavity components, using a segmented electrode structure such as the one described above. The laser housing 11 with its central bore 10 and water cooling passages 12, are similar to those shown in FIG. 1, except that the cylindrical electrodes and ceramic-based lasing channels of FIG. 1 are replaced with a segmented structure, shown in the example of FIG. 3 as a hexagonal structure 30, though, as stated elsewhere in this disclosure, such a hexagonal structure is only one way of implementing the cavity structure. At the top side of the segmented electrode structure 30, there is shown a single segment separated into its component parts. The innermost element 31, is a portion of the metallic inner electrode. Moving radially outwards, a portion 32 of the channeled ceramic element is shown. Outside of the ceramic element 32, a further metallic element 33 is shown, this being a portion of the outer electrode. The above three elements all have the form of a part of a circular annulus. In the exemplary cavity shown in FIG. 3, the outer electrode 33 has a flat outer surface. This flat outer surface, also shown on the other assembled segments of the hexagonal electrode structure 30, fits flush onto corresponding flat inner surfaces of the bore 10 of the cooled laser cavity housing 11. By providing contact between two flat surfaces, better thermal transfer can be achieved than would be generally available by contact between two curved surfaces, though it is to be understood that the structure could also use circular surfaces on the outer faces of the outer electrode 33, and the inner surface of the bore 10 of the laser cavity housing.

Although the outer surface of the electrode/ceramic structure 30 is polygonal, specifically hexagonal in the example shown, it is to be emphasized that the ceramic element itself, 20 in FIG. 2A, is most conveniently formed as right circular cylindrical shape, since the lasing channels are formed within the ceramic element, and the continuous lasing path through the zig-zag channels can be most simply achieved around a circular cylindrical element. A polygonal cylindrical element may also be used, but the apexes of the zig-zag paths must then fall on the points defined by the meeting of adjacent polygon faces.

The separate segments are mounted within the laser housing 10 to form a complete annular electrode and channeled ceramic unit. However, in order to maintain the individual electrode/ceramic segments in positive thermal, mechanical and electrical contact with the laser housing bore 10, a novel radially acting spring element 35 is used, as shown in FIG. 3. This spring element applies a radially outward directed force to each of the segments of the hexagonal electrode/ceramic structure 30, ensuring that each entire segment is forced into good contact with the inner surface of the laser housing bore 10. This ensures mechanical stability, good thermal contact for conducting away the heat generated within the laser channels to the water cooled housing 11, and good electrical contact, both between the outer electrode and the housing 11, held at ground potential, and between the inner electrode and the spring element 35, to which is applied the RF discharge exciting potential. In the exemplary spring element 35 shown in FIG. 3, metallic leaf springs 37 arranged circumferentially around a central core 36, are used to provide the radially outward force for application to the electrode/ceramic segments. Metallic leaf springs have high durability and withstand the high temperatures expected within the electrode structure. However, it is to be understood that any similar radially directed spring element may be used, such as rows of coil springs, or temperature resistant elastomers, on condition that they maintain their stiffness, and have a long lifetime under the temperature conditions expected. End plates 38 are used to assemble the spring element 35 within the core of the hexagonal electrode ceramic structure 30, with an electrical contact for applying the RF exciting voltage.

Figure 4A:
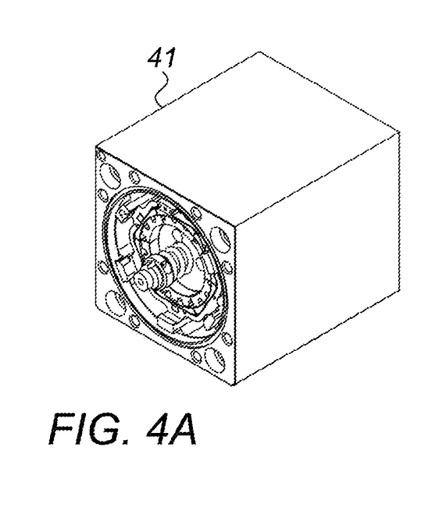
FIGS. 4A, 4B, 4C and 4D show various engineering views of a completely assembled, laser cavity housing.
Figure 4B:
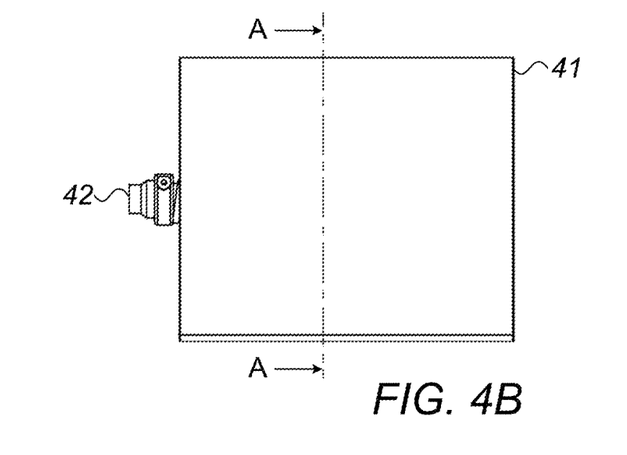
Figure 4C:
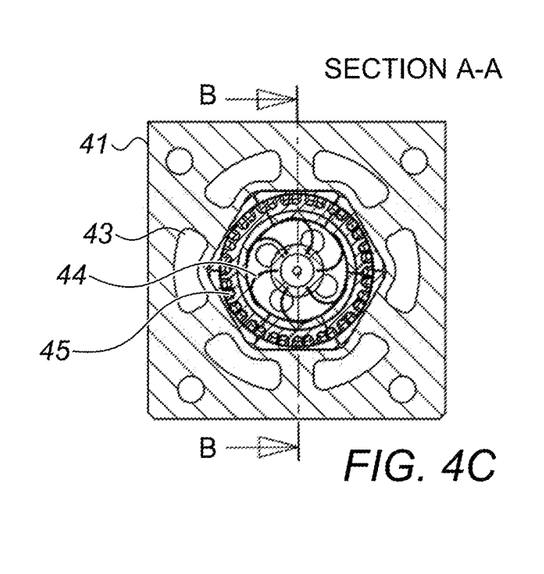
Figure 4D:
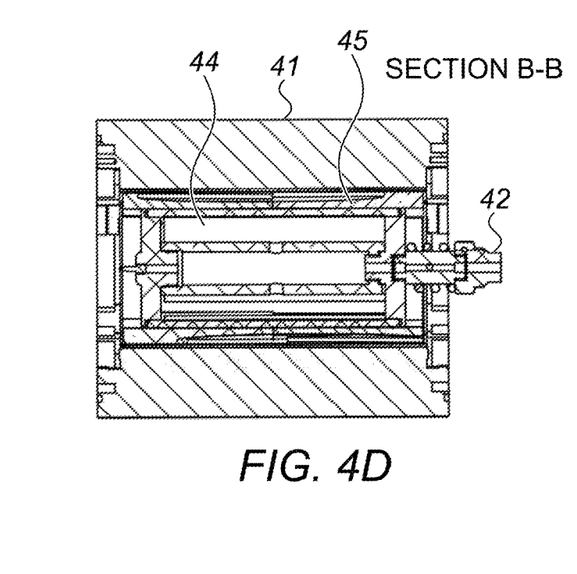

Reference is now made to FIGS. 4A to 4D, which show various engineering views of a completely assembled, laser cavity housing, of the type described in this disclosure. FIG. 4A shows an isometric view of the completely assembled laser cavity housing 41. FIG. 4B is a side elevation view of the assembled laser cavity housing 41, showing an RF voltage adjustment element 42. FIG. 4C is an end view of the assembled laser cavity housing 41, showing the reservoir gas compartments 43, the leaf springs 44, and the composite electrode/ceramic assembly 45 with its laser channels. FIG. 4D is a longitudinal cross section of the assembled laser cavity housing 41, showing the voltage adjustment element 42, the leaf springs 44, and the composite electrode/ceramic assembly 45 with its laser channels.

Figure 5:
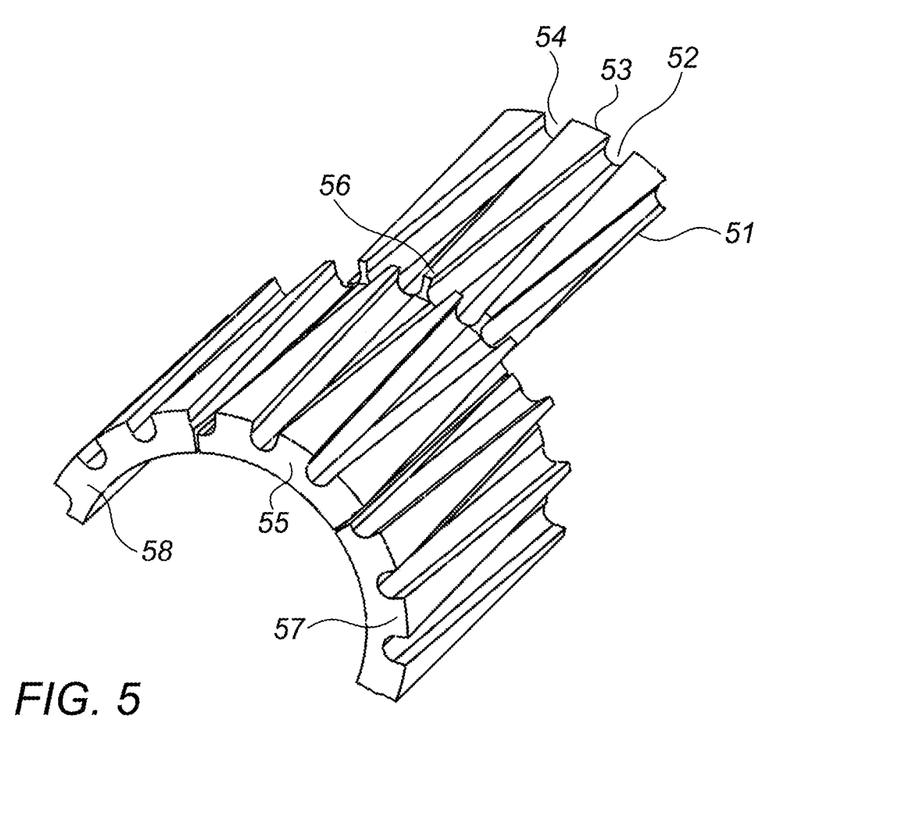
FIG. 5 illustrates a method of constructing the ceramic segments of the laser cavity with their zig-zag lasing channels.

Reference is now made to FIG. 5, which illustrates a method of constructing the ceramic sections with their zig-zag lasing channels, in a cost-effective and simple manner, using a single channeled element design to generate both ends of the total length of the zig-zag channels. The element 51 has a channel 52, which widens from one end to the other end of the element 51. The wall 53 between a pair of adjacent channels 52, 54, thus tapers from a broad end to a narrow end 56, conversely to the widening of the channel from that one end to the other end of the element 51. By positioning a second element 55, identical in construction to element 51, but turned end-to-end through 180 from the orientation of the first element 51, as if a mirror image of element 51, and offset from the first element by half of the width of the broad end of a channel, such that the narrow end 56 of the wall 53 falls in these center of the broad end of a channel of element 55, the zig-zag channel structure can be generated, using ceramic elements of only half of the length of the total laser cavity. Adjacent to ceramic segment 55, there are shown ceramic segments 57 and 58, illustrating how the combination of adjacent ceramic segmented elements can generate a complete cylindrical ceramic element, with its zigzag channels for the lasing cavity path.

Figure 6:
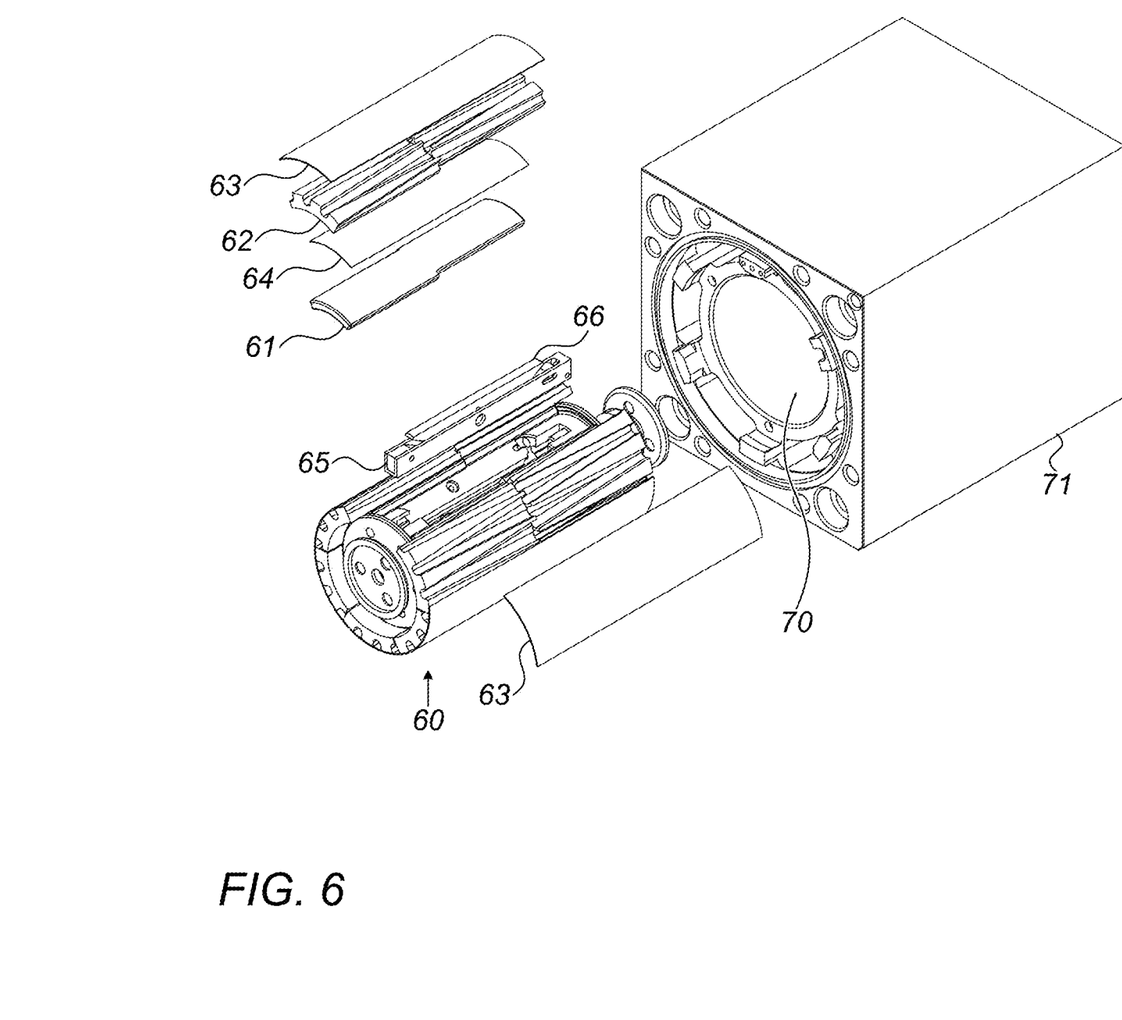
FIG. 6 illustrates an alternative mechanical assembly for implementing the provision of good thermal cooling in a cavity structure of the present devices.

Reference is now made to FIG. 6, which illustrates an alternative mechanical assembly for implementing the cavity structure of the present devices, which differs from that shown in FIG. 3, in that the complete central annular electrode and channeled ceramic unit 60 has a conventional cylindrical form, which fits into a cylindrical bore 70 (corresponding to bore 10 in FIG. 3) within the housing 71 (corresponding to housing 11 in FIG. 3). The central core element 60 is still formed of segments, but the use of a cylindrical fit between the outer circumference of the cylindrical core assembly and the inner surface of the cylindrical bore, enables good thermal contact to be made, while the cylindrical bore has a simpler mechanical interface from construction considerations, than the flat segments of the implementation of FIG. 3. In FIG. 6, the positive contact between the cylindrically ground outer diameters of the laser ceramic core, and the inner bore 70 of the cooled laser housing 71 is achieved by means of a novel force mechanism 65, 66, details of which are shown hereinbelow in FIG. 7. This mechanism is used instead of the metallic leaf springs 37 of the implementation of FIG. 3, in order to provide positive outward forces to ensure good thermal contact between each ceramic segment and the water cooled inner bore 70 of the laser housing 71. The mechanism applies outward radial force on the inner electrode segment 61, advantageously constructed of aluminium, and sufficiently thick that the outward line force of the mechanism 65, 66, does not cause undue deformation. Another thin element 64 made of a soft material such as silver, may be positioned outwards of the aluminium electrode element 61, as a metallic stress-matching element, since its softness enables that element to deform to the exact profile of the inside surface of the channeled ceramic elements 62. Good thermal contact of the outer surface of the channeled ceramic element 62, with the inner bore of the laser housing is achieved by a second thin soft metal element 63, also advantageously made of silver, which adjusts to the exact profile of the inner cooled bore, thereby ensuring good thermal contact. This element 63 may preferably be coated with gold on its inner surface which is in contact with the laser discharge plasma in the ceramic channels, gold being known as a catalyst to reform decomposed carbon dioxide using atomic oxygen, generated by the discharge, if the laser is a carbon dioxide laser. In a similar manner to that enabled in the implementation of FIG. 3, the RF voltage is applied from the input connector to the inner electrode by means of the metallic contact through the parts of the force application mechanism of this implementation.

Figure 7:
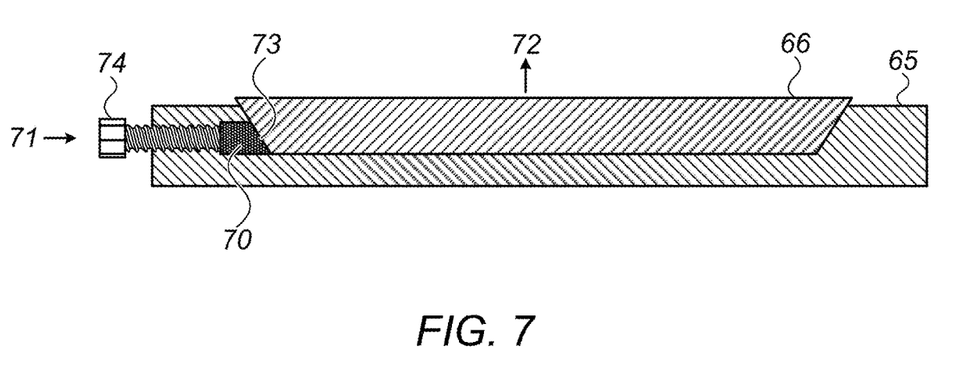
FIG. 7 shows the pressure application mechanism of the device shown in FIG. 6.

Reference is now made to FIG. 7, which is a schematic cross-section of a mechanism used for applying a positive outward force onto a laser segment, in order to provide good thermal contact with the bore 70 of the cooled laser housing 71. The mechanism consists of an elongated base element 65, having a length generally slightly shorter than that of the laser discharge segments. The base element 65 has a slot formed along most of its length, the slot having sloped ends. A trapezoidal shaped pressure element 66 is fitted into the slot, the pressure element having sloped ends which match the slope of the ends of the slot in the base element 65. At least one end of the base element has a movable force application element 70, opening onto the sloped end of the slot, such that motion of the force application element 70 in a longitudinal direction 71 towards the slot, applies force to the sloping end of the pressure element 66, forcing it outwards 72 onto the back of the aluminium electrode element 61, thereby forcing the complete lasing segment outwards into good thermal contact with the inner bore 70 of the cooled laser housing 71. The longitudinal motion of the force application element 70 can be readily applied by means of an adjustment screw 74. In use, the adjusting screw 74 of each force mechanism is tightened until the pressure element 66 pushes each laser segment into firm contact with the inner bore of the laser housing. Though the pressure element 66 and the slot in the elongated base element 65 are shown in FIG. 7 as having a straight sloping ends, it is to be understood that curved ends may also be feasibly used.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A laser system, comprising:
a housing having a first end and a second end, and a bore having an axis running between said first and second ends;
a pair of coaxial metallic electrodes disposed within said bore, said pair comprising an inner electrode and an outer electrode, said electrodes being constructed to have a gap between them and configured to have an RF field applied between them;
folding mirrors disposed at each end region of said housing; and
a ceramic material disposed in the gap between said coaxial electrodes, said ceramic material having a series of channels formed therein, such that they generate a zig-zag pathway between said folding mirrors, wherein said zig-zag pathway, when filled with a gain medium, and said folding mirrors, together constitute a laser resonator cavity.

2. The laser system according to claim 1, wherein said pair of coaxial metallic electrodes and said ceramic material is made up of a plurality of circumferentially angular segments, each segment comprising at least one longitudinal section of said ceramic material sandwiched between sections of said inner and outer electrodes, said segments being disposed circumferentially adjacent to each other to form a cylinder.

3. The laser system according to claim 2, wherein said segments have a curved outer surface having a circular curvature, whose radius matches the radius of the corresponding circularly curved internal surface of said bore.

4. The laser system according to claim 2, wherein said segments are provided with a flat outer surface, configured to ensure good thermal contact with corresponding flat surfaces formed within said bore.

5. The laser system according to claim 1, wherein said folding mirrors are spherical mirrors.

6. The laser system according to claim 1, wherein said folding mirrors are annular in shape.

7. The laser system according to claim 1, wherein each of said folding mirrors comprises an aperture disposed in its peripheral region, opposite an end of a channel formed in said ceramic material, said laser system further comprising an end mirror disposed adjacent each aperture, one of said end mirrors being a full reflector, and the other of said end mirrors being a partial reflector.

8. The laser system according to claim 7, wherein each of said end mirrors is aligned with its reflecting surface perpendicular to a channel of the zig-zag path in said ceramic material leading onto said end mirror.

9. The laser system according to claim 1, wherein one of said folding mirrors comprises an aperture disposed in its peripheral region, opposite an end of a channel formed in said ceramic material, said laser system further comprising a pair of end mirrors disposed adjacent said aperture, one of said end mirrors being a full reflector, and the other of said end mirrors being a partial reflector.

10. The laser system according to claim 9, wherein each of said end mirrors is oriented with its reflecting surface perpendicular to one of the two channels meeting opposite said aperture.

11. The laser system according to claim 2, further comprising a set of radially acting spring elements disposed within said inner electrode, such that said segments are forced by said spring elements against the inner surface of said bore of said housing.

12. The laser system according to claim 11, wherein said spring elements are leaf springs aligned along the length of said inner electrode segments.

13. The laser system according to claim 2, further comprising a mechanical mechanism disposed within said inner electrodes, for generating a radially outwardly directed force, such that said segments are forced against the inner surface of said bore of said housing.

14. The laser system according to claim 13, further comprising a thin intermediate layer of a soft metallic material disposed between at least one of (a) said outer electrode and said ceramic material, and (b) said ceramic material and said outer electrode.

15. The laser system according to claim 13, wherein said thin intermediate layer of a soft metallic material, is a silver foil.

16. The laser system according to claim 15, wherein said silver foil is coated with gold.

17. The laser system according to claim 13, wherein said mechanical mechanism comprises an elongated base element having a slot with sloping ends, and a pressure element having matching sloping ends disposed within said slot, such that longitudinal force applied to at least one of said sloping ends causes said pressure element to move out of said slot.

18. The laser system according to claim 17, further comprising a screw disposed such that its rotation supplies said longitudinal force.

19. The laser system of claim 1, wherein said ceramic material is selected from the group consisting of beryllium oxide and aluminium oxide.

20. The laser system of wherein of claim 1, wherein one but not the other of the following is true: (a) said gain medium is such that said laser system is a carbon dioxide laser system (b) said gain medium is such that said laser system is a carbon monoxide laser system.

21. The laser system of claim 1, wherein said gain medium is such that said laser system is a carbon monoxide laser system.

* * * * *